United States Patent [19]

Yamada

[11] Patent Number: 4,635,029
[45] Date of Patent: Jan. 6, 1987

[54] SIGNAL TRANSMISSION APPARATUS FOR STEERING CONTROL BOARD

[75] Inventor: Takahiro Yamada, Tokyo, Japan

[73] Assignee: Aisin Seiki Kabushiki Kaisha, Japan

[21] Appl. No.: 505,549

[22] Filed: Jun. 17, 1983

[30] Foreign Application Priority Data

Jun. 19, 1982 [JP] Japan ................................ 57-105782

[51] Int. Cl.$^4$ .............................................. B60Q 1/00
[52] U.S. Cl. ................................... 340/22; 307/10 R; 339/3 S
[58] Field of Search .............. 180/78, 79, 90; 340/22; 307/10 R; 455/608; 339/3 S

[56] References Cited

U.S. PATENT DOCUMENTS

| | | | |
|---|---|---|---|
| 1,795,566 | 3/1931 | MacComb | 180/78 |
| 3,543,874 | 12/1970 | Nevett | 180/78 |
| 3,600,587 | 8/1971 | Smith | 455/608 |
| 4,157,854 | 6/1979 | Beauch | 339/3 S |
| 4,368,454 | 1/1983 | Pilatzki | 340/22 |
| 4,438,425 | 3/1984 | Tsuchida et al. | 307/10 R |
| 4,456,903 | 6/1984 | Kishi et al. | 307/10 R |

FOREIGN PATENT DOCUMENTS 0047498 8/1982 European Pat. Off. .
0110542 7/1982 Japan ..................................... 180/78

Primary Examiner—Charles A. Ruehl
Assistant Examiner—T. Rittmaster
Attorney, Agent, or Firm—Sughrue, Mion, Zinn, Macpeak, and Seas

[57] ABSTRACT

An apparatus for transmitting signals between a load-vehicle stationary unit and a control board mounted on a steering wheel. A light is utilized as a means for transmitting information. The control board is mounted on the steering wheel in a floating relation with such a structure that the relative position between the stationary unit and the control board remains unchanged. A plurality of light emitting elements and light receiving elements opposite to the formers are disposed at different positions in accordance with the shape and position of one or more spoke of the steering wheel, so that all light beams are not interrupted by the spoke of the wheel at the same time. The light emitting and receiving means are provided on each of the stationary unit and the control board to permit bidirectional transmission of signals.

7 Claims, 16 Drawing Figures

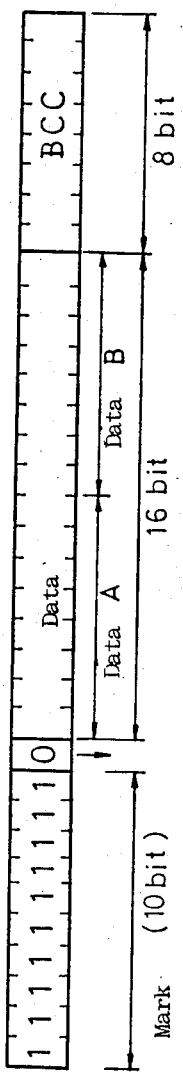

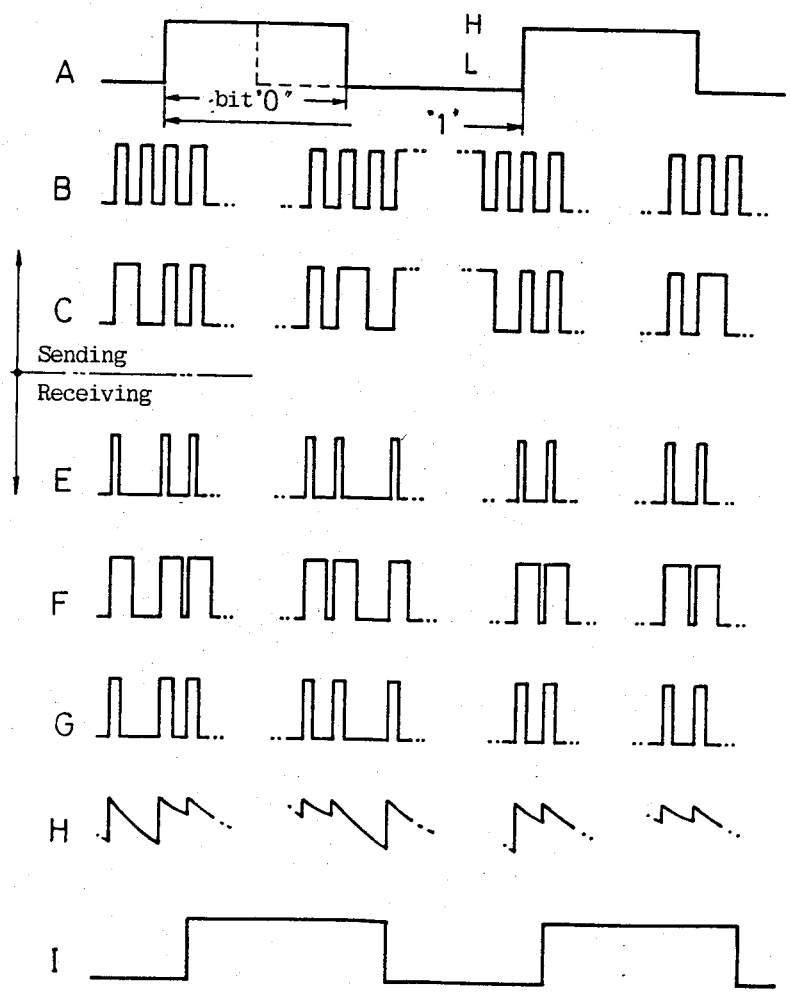

SIGNAL TRANSMISSION APPARATUS FOR STEERING CONTROL BOARD

BACKGROUND OF THE INVENTION

This invention relates to a signal transmission apparatus for a steering control board which is used for transmitting signals between the control board mounted at the central portion of a steering wheel in a floating relation with respect to the wheel and a stationary control unit mounted on a vehicle body.

In vehicles, a steering wheel is positioned nearest to the driver and moreover near hands of the driver. Thus, in order to improve operability, a control board equipped with key switches, etc. used in the control and indication for load-vehicle units and devices is preferable to be mounted at the central portion of the steering wheel.

However, since a steering mechanism adapted to transmit the rotational movement of the steering wheel to a steering shaft has a complicated structure, it is difficult to wire signal cables connecting the control board mounted at the central portion of the steering wheel (referred to as steering control board) with a stationary control unit. In particular, when the control board is mounted on the steering wheel in a floating relation to ensure that the former remains motionless even with the latter being operated to turn, a still more complicated mechanism must be interposed between the control board and the steering wheel. This makes it very difficult to connect the control board with the stationary control unit using the normal lines.

U.S. patent application Ser. No. 399,582 filed on July 17, 1982, which is assigned to the same assignee as the present application, discloses a system in which the control board is connected with the stationary control unit using a slip ring and a brush, so that transmission of both electric power and signals is effected through those two members in slide-contact with each other. According to this system, electric power supplied to the control board as well as many data generated from the control board can be transmitted without using a number of lines.

But, since the proposed system employs mechanical elements such as a slip ring and a brush, it is hard to ensure satisfactorious reliability for a long term. For example, if the contact surfaces of the slip ring and the brush are oxidized attendant on changes with aging, or if a pressing force urged upon the contact portions is lowered, the circuit may be disconnected temporarily due to mechanical vibrations or so from the external. As to transmission of electric power, it is possible that temporary disconnection of the power supply circuit is made to cause no adverse influence by using a capacitor with relatively large capacity or by other techniques. As to transmission of signals, on the other hand, there will be such a possible danger that an error is caused in the received information and hence the stationary control unit malfunctions.

To eliminate such adverse influence, there has been proposed another system which utilizes a light for transmission of signals. In this system, however, the relative position between an optical element (e.g., a light emitting element) on the steering wheel and an optical element (e.g., a light receiving element) on the stationary load-vehicle side is varied with the steering wheel being turned for steering operation. Thus, transmission of signals will be interrupted temporarily.

To eliminate the foregoing drawback, there has been also proposed such a system that a number of light emitting elements are disposed at the central portion of the steering wheel in the annular form and a light receiving element is disposed at a position opposite to those light emitting elements, whereby a light from one of the light emitting elements can always reach the light receiving element. With this system, however, in case the control board is mounted on the steering wheel in a floating relation, spokes for supporting the steering wheel must be arranged between the light emitting and receiving elements. Thus, when the steering wheel is turned, the optical path between both elements will be interrupted by the presence of the spokes. Further, this system requires a number of light emitting elements, so that it is not practically advantageous in point of the cost and power consumption.

SUMMARY OF THE INVENTION

A first object of this invention is to dispose a control board at the central portion of a steering wheel in a manner that the former is not rotated together with the latter. A second object of this invention is to provide a signal transmission apparatus in which a signal path will never be disconnected when the steering wheel is operated to turn. And a third object of this invention is to provide a signal transmission apparatus which suffers less changes with aging and has high reliability.

To achieve the above objects, this invention is featured in using a plurality of light emitting means and light receiving means to transmit signals between the control board and a stationary control unit in an optical manner. The light emitting and receiving means are provided in plural pairs, and the respective light emitting and receiving means are positioned so that an optical path between the light emitting means and the light receiving means of at least one pair will not be interrupted along with the movement of spokes of the steering wheel, i.e., so that all of the light emitting and receiving means will not be entered in the projected areas of the spokes at the same time. More specifically, in such an arrangement that the control board is mounted on the steering wheel in a floating relation so as to remain motionless even with the steering wheel being turned, or that the control board is connected to the steering wheel through a reduction gear so as to not rotate substantially, the light emitting and receiving means of each pair are positioned and coupled by a light beam meeting the above requirement. With this, even if an optical path between the light emitting and receiving means of one pair be interrupted when the steering wheel is operated to allow the spokes for supporting the wheel to move together, an optical path between both means of at least one pair among the remaining ones will not be interrupted. In case the steering wheel is supported by a single spoke, it is enough for the light emitting and receiving means to be set in two pairs. But, in case the spoke is provided in plural number or in case the spoke has a special form, the pairs number of the light emitting and receiving means should be increased to three, four or more in accordance with the condition of the spoke.

For the purpose of acknowledging the receiving processing and controlling state display on the steering wheel control board, it is preferable that a given signal is transmitted from the stationary control unit mounted on the vehicle to the steering wheel control board. Thus, in a preferred embodiment of this invention, both light emitting and receiving means are provided on each of the steering control board and the stationary member, so that both the steering control board and the load-vehicle stationary control unit are endowed with information transmitting function as well as information receiving function. This permits to transmit information with high reliability and to display the vehicle speed, the number of revolutions of the engine, etc. on the steering wheel control board.

BRIEF DESCRIPTION OF THE DRAWINGS

FIG. 4a is a plan view showing a frame structure of the transmitted signal;

FIGS. 4b and 4c are plan views showing the content of the transmitted data;

FIG. 5 is a timing chart showing input and output signals for the modulation/driving circuit and the demodulation circuit;

DESCRIPTION OF PREFERRED EMBODIMENT

Figure 1:
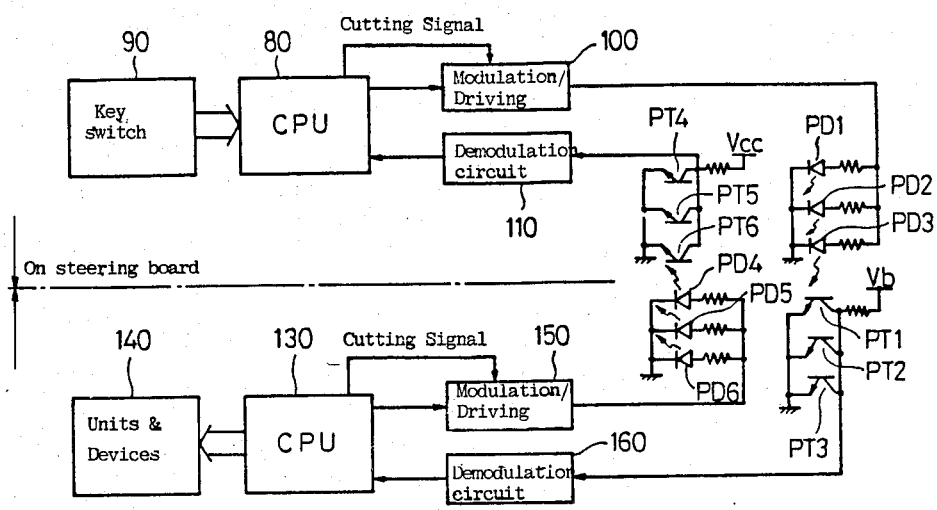
FIG. 1 is a block diagram showing a schematic structure of the apparatus according to one embodiment of this invention.

In the following, one embodiment of this invention will be described with reference to the drawings. FIG. 1 shows a schematic structure of one embodiment of this invention. In this embodiment, a control board mounted on a steering wheel is equipped with a microcomputer unit 80 serving as a signal transmission control unit, a key switch 90, a modulation/driving circuit 100 and a demodulation circuit 110. A stationary control unit on the vehicular body side is equipped with a microcomputer unit 130 serving as a signal transmission/control unit, a modulation/driving circuit 150 and a demodulation circuit 160, the microcomputer unit 130 being connected to various units and devices 140. The modulation/driving circuit 100 in the steering wheel control board and the modulation/driving circuit 150 in the stationary control unit on the vehicular body side respectively include three light emitting means, i.e., photo diodes PD1, PD2 and PD3 and PD4, PD5 and PD6, which are connected in parallel. The demodulation circuit 110 in the steering wheel control board and the demodulation circuit 160 in the stationary control unit on the vehicular body side respectively include three light receiving means, i.e., photo transistors PT1, PT2 and PT3 and PT4, PT5 and PT6, which are connected in parallel. The photo diodes PD1, PD2, PD3, PD4, PD5 and PD6 and the photo transistors PT1, PT2, PT3, PT4, PT5 and PT6 have light emitting surfaces and light receiving surfaces opposite to each other with a given spacing, respectively, as described later.

Figure 2A:
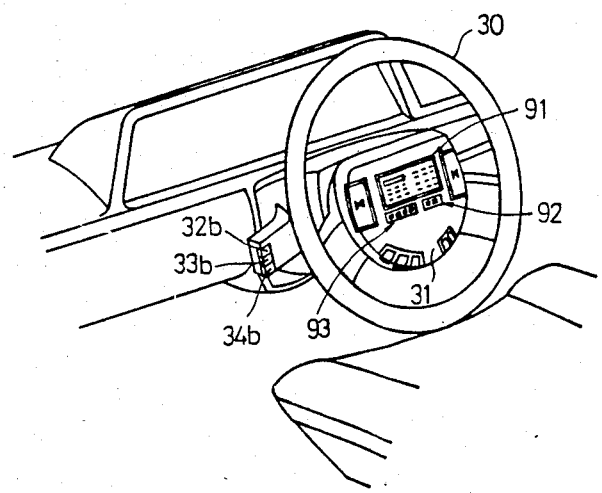
FIGS. 2a and 2b are a perspective view and a plan view showing an external appearance of the steering wheel control board used in one embodiment of this invention, respectively.
Figure 2B:
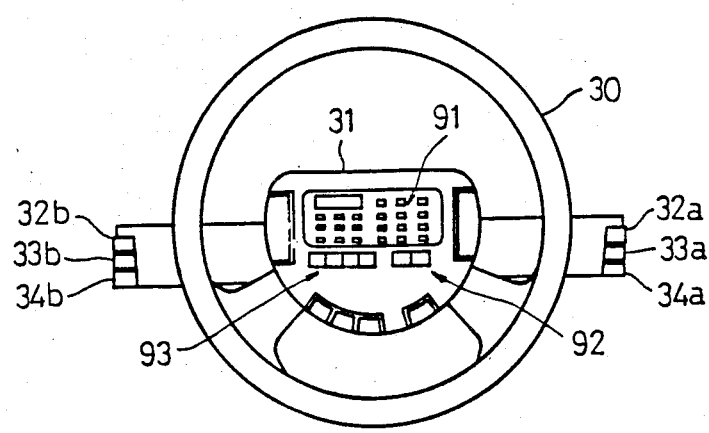

FIG. 2a is a perspective view of an external appearance of the steering wheel, and FIG. 2b is a front view thereof. Referring now to FIGS. 2a and 2b, the reference numeral 30 designates a steering wheel which is provided at its central portion with a control panel 31 for an attitude control units. On the right-hand side of the steering wheel 30 there are disposed three switches 32a, 33a and 34a used for controlling a tilt angle. More specifically, the numeral 32a is an up switch used for correcting an up-and-down angle upwardly, 33a is a down switch used for correcting the up-and-down angle downwardly, and 34a is an away switch used for designating the up-and-down angle at an upper limit retreat position (tilt-away position) as well as for returning the up-and-down angle from the upper limit retreat position to the original driving position.

On the left-hand side of the steering wheel 30 there are disposed three switches 32b, 33b and 34b used for adjusting a wheel height. More specifically, the numeral 32b is an up switch actuated for allowing the wheel to elevate, 33b is a down switch actuated for allowing the wheel to lower, and 34b is an away switch actuated for allowing the wheel to be driven to the upper limit retreat position as well as for allowing the wheel to be driven to the driving position when it is at the upper limit retreat position.

Figure 2C:
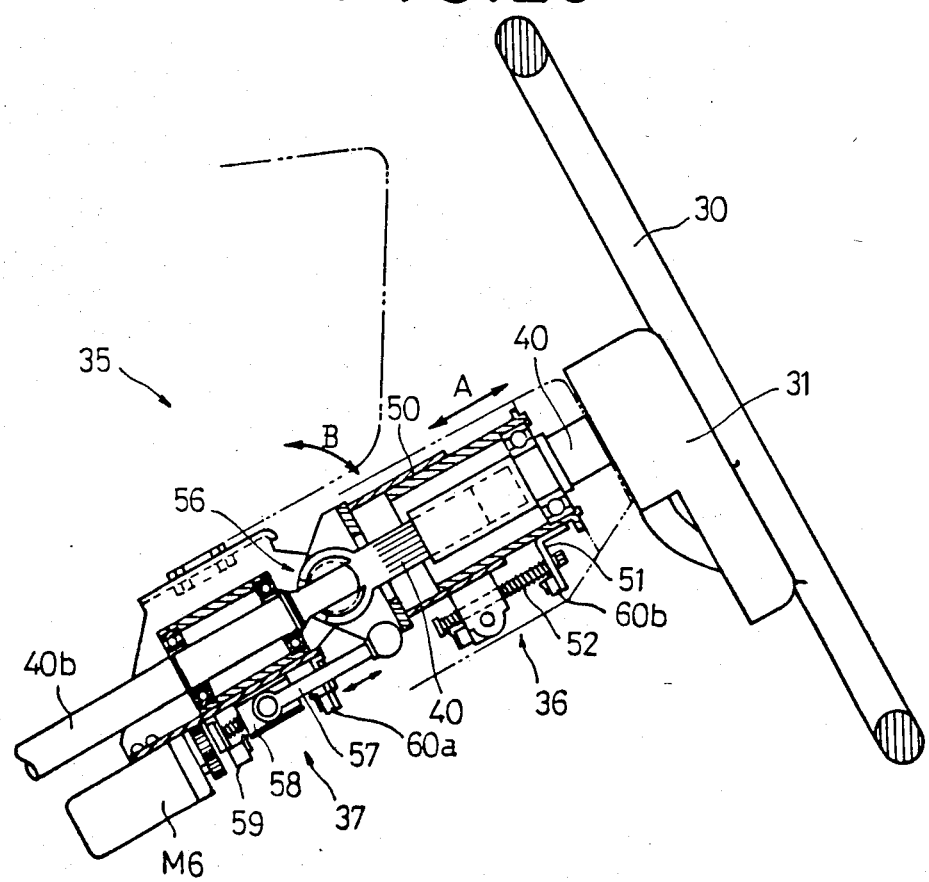
FIG. 2c is a longitudinal sectional view of the steering system section.

FIG. 2c is a side view showing a control section 35 of a steering mechanism. This control section 35 is mainly composed of the steering wheel 30, the control panel 31, a steering wheel telescoping mechanism 36 and a tilting mechanism 37. FIG. 2d shows a supporting structure of the steering wheel 30 and the control panel 31.

Referring now to FIGS. 2c and 2d, a first support 38 is fixed to a body of the vehicle and an external gear 39 is secured to the first support 38. The numeral 40 denotes a steering main shaft. A second support 41 is secured to the steering main shaft 40 and is rotatable with respect to the first support 38. The second support 41 is integral with the steering wheel 30 and spokes 42.

The numeral 43 denotes a steering wheel control board which is supported by a third support 44. An external gear 45 is secured to the third support 44, while a shaft 46 is rotatably supported by the second support 41. At both ends of the shaft 46 there secured pinion gears 47 and 48 with the same number of teeth, the pinion gears 47 and 48 being meashed with the external gears 39 and 45, respectively.

Both external gears 39 and 45 have the same number of teeth. Therefore, when the spokes 42 are rotated upon operation of the steering wheel, the second support 41 is rotated and hence the steering main shaft 40 connected to the second support 41 is also rotated. At this time, the shaft 46 revolves round both external gears 39 and 45 along the outer peripheries thereof, and the pinion gears 47 and 48 connected to the shaft 46 are rotated by the same angle, so that the relative position of the external gears 39 and 45 remains unchanged. In other words, the steering control board 43 is not changed in its position (i.e., inclination) with respect to the vehicular body even with the steering wheel being turned.

The steering control board 43 comprises a printed circuit board PCB including the microcomputer unit 80, the modulation/driving circuit 100 and the demodulation circuit 110, and a key switch board KSB equipped with a number of switches, the PCB and the KSB being connected to each other through a connector CN. The steering control board also comprises a battery as a power source. The printed circuit board PCB further includes the photo diodes PD1, PD2 and PD3 as well as the photo transistors PT4, PT5 and PT6 used for transmission of signals, which are disposed at predetermined positions spaced from the steering main shaft 40 by almost equal distances in an angularly dispersed relation. On the stationary member side, e.g., on the first support 38, there are mounted the photo diodes PD4, PD5 and PD6 as well as the photo transistors PT1, PT2 and PT3 used for transmission of signals, which are positioned opposite to the photo transistors PT4, PT5 and PT6 and the photo diodes PD1, PD2 and PD3, respectively.

Figure 2E:
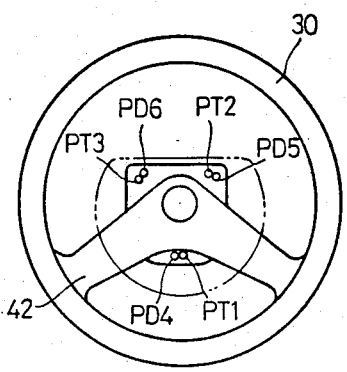
FIG. 2e is a plan view showing an external appearance of the steering wheel.
Figure 2D:
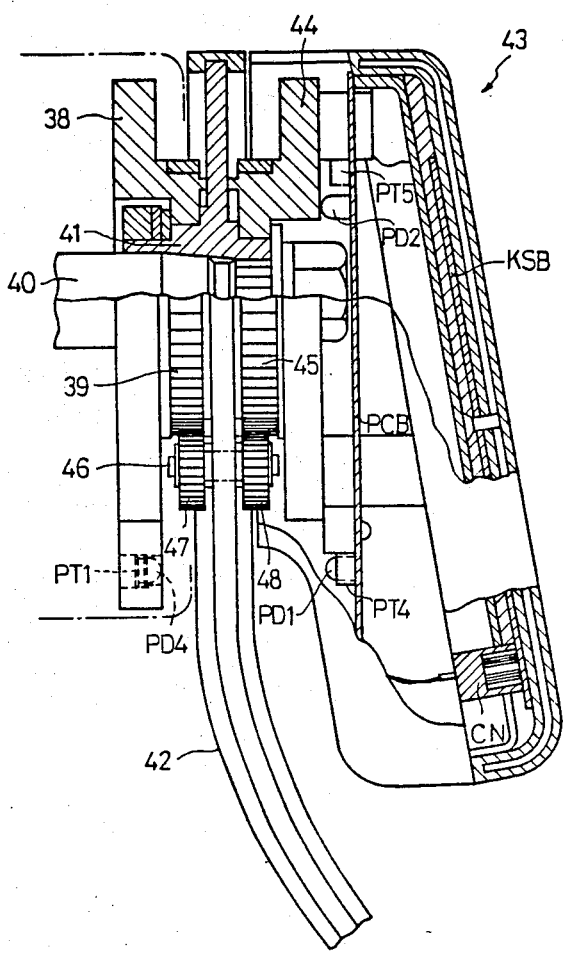
FIG. 2d is a longitudinal sectional view of the mounting portion of the steering wheel control board.

The set positions of these photo diodes and photo transistors are selected in relation to the position of the spokes, as shown in FIG. 2e. More specifically, the positions are so selected that when the two spokes 42 are moved upon turning operation of the steering wheel 30, three pairs of optical paths respectively connecting the photo diodes PD1, PD2 and PD3 on the steering control board 43 to the photo transistors PT1, PT2 and PT3 on the stationary member side and optical paths respectively connecting the photo diodes PD4, PD5 and PD6 on the stationary member side to the photo transistors PT4, PT5 and PT6 on the steering control board 43 are not interrupted simultaneously at the least.

With the illustrated arrangement, for example, even if the optical paths between PD1-PT1, PD2-PT2, PD4-PT4 and PD5-PT5 be interrupted by the spokes 42, the optical paths between PD3-PT3 and PD6-PT6 will not be interrupted. As an alternative, in case the optical paths between PD1-PT1, PD3-PT3, PD4-PT4 and PD5-PT5 are interrupted by the spokes 42, the optical paths between PD2-PT2 and PD5-PT5 remain uninterrupted.

Besides, in this embodiment, since the portion of the second support 41 engaging with the steering main shaft 40 is formed to have the same shape as the engaging portion of the steering wheel widely used at present, and since the steering wheel 30, spokes 42 and the second support 41 as well as the steering control board 43 are respectively formed into a unitized structure, a unit comprising of the integral steering wheel section and the integral steering control board section can be mounted on most motor vehicles presently commercialized in place of the general type steering wheel without a need of providing a special mechanism additionally.

Figure 3A:
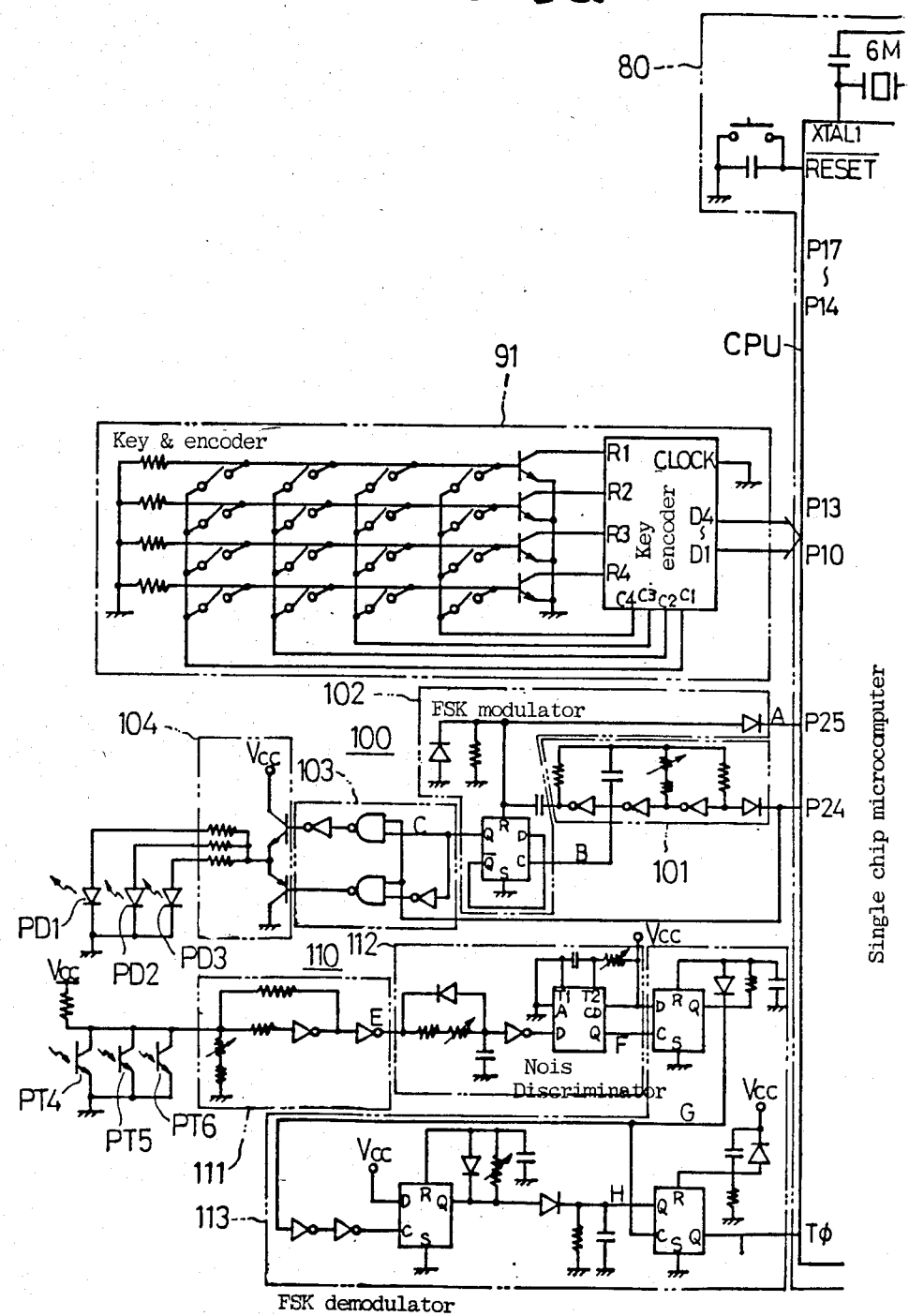
FIGS. 3a and 3b are block diagrams showing a circuitry of the steering wheel control board.
Figure 3B:
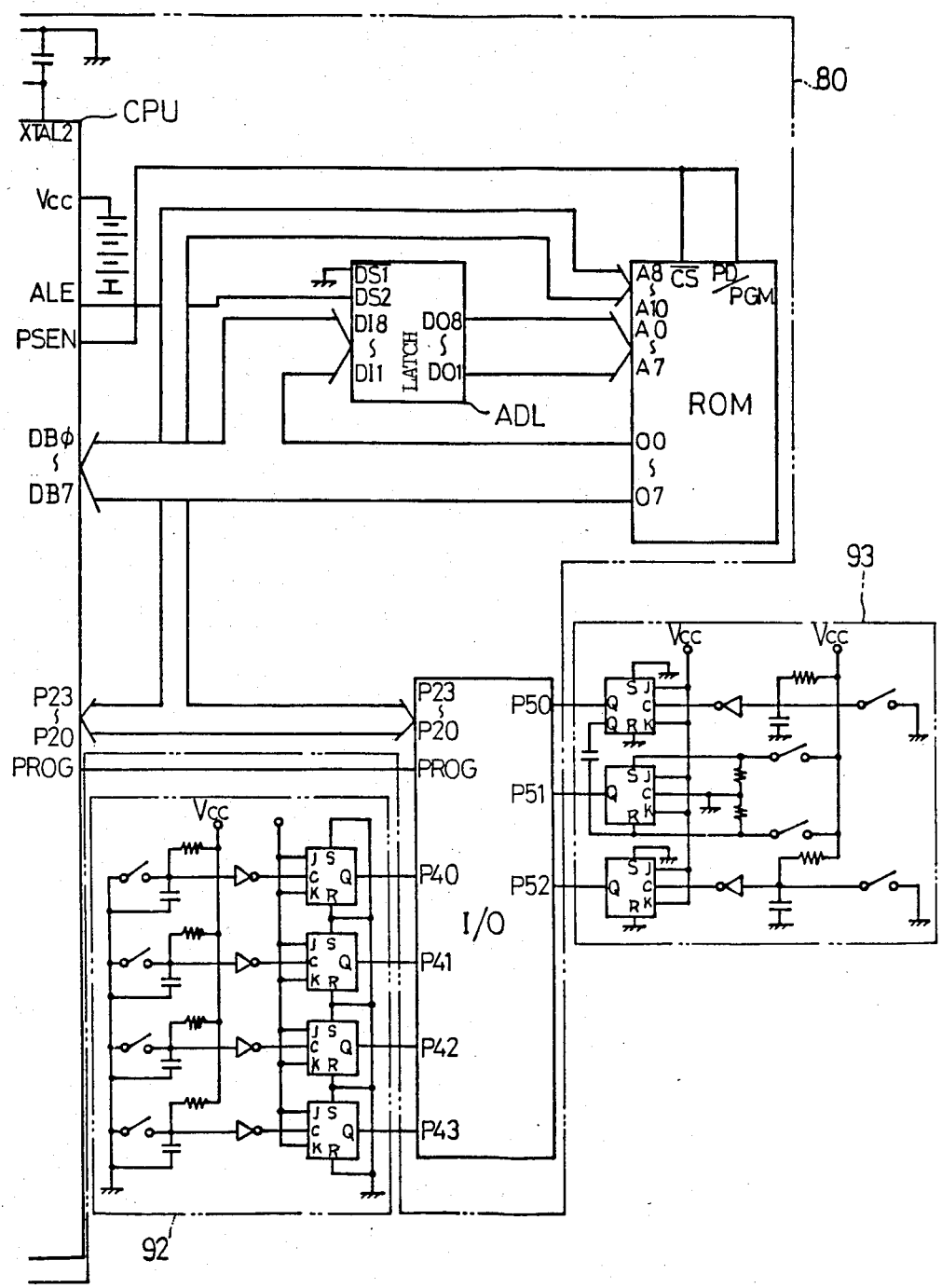

FIGS. 3a and 3b show an electric circuit included in the printed circuit board PCB which is fitted in the steering control board 43. Referring now to these figures, the key switch 90 shown in FIG. 1 is composed of, in the circuit shown in FIGS. 3a and 3b, a key input section 91 which combinedly includes momentary key switches closed only while the keys are being pressed down and a key encoder, and control switch input sections 92 and 93 each of which includes control switches that are closed when once pressed down and are opened when pressed down subsequently as well as flip-flops used for latching the state. The modulation/driving circuit 100 is composed of a pulse oscillator 101, a FSK (Frequency Shift Keying) modulator 102, an output cut-off gate 103 and a sending driver 104, whereas the demodulation circuit 110 is composed of an amplification/waveform shaping circuit 111, a noise discrimination circuit 112 and a FSK demodulator 113. The microcomputer unit 80 is composed of a single-chip microcomputer CPU, an address latch ADL, a semiconductor read-only memory ROM, an input/output interface I/O, a reset switch and a clock pulse oscillator. The ROM stores therein key input reading program data and sending control program data the latter of which is used to form and then transmit a sending code in accordance with changes in the key state.

Figure 3C:
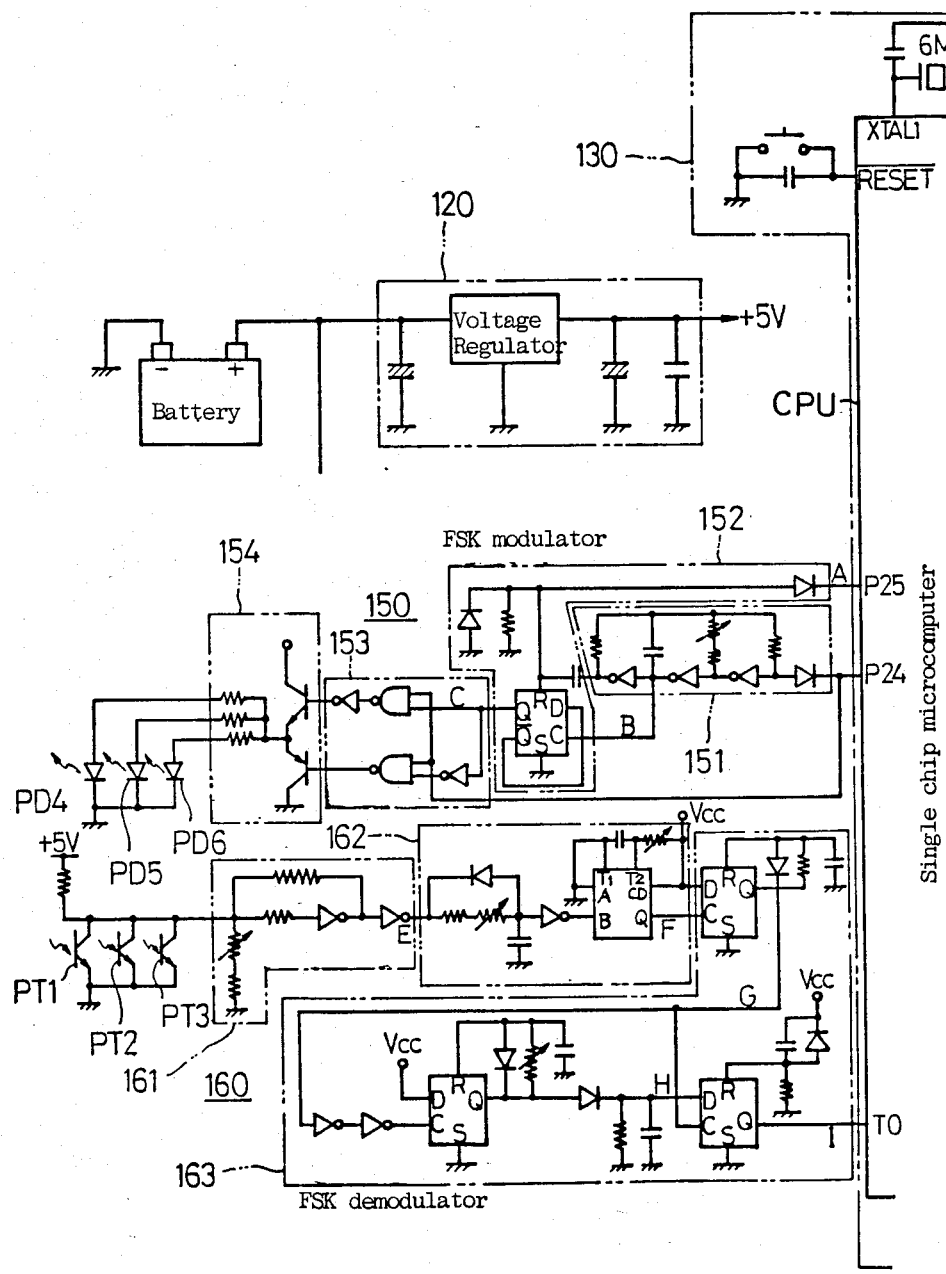
FIGS. 3c and 3d are block diagrams showing a circuitry of the stationary control unit on the vehicular body side.
Figure 3D:
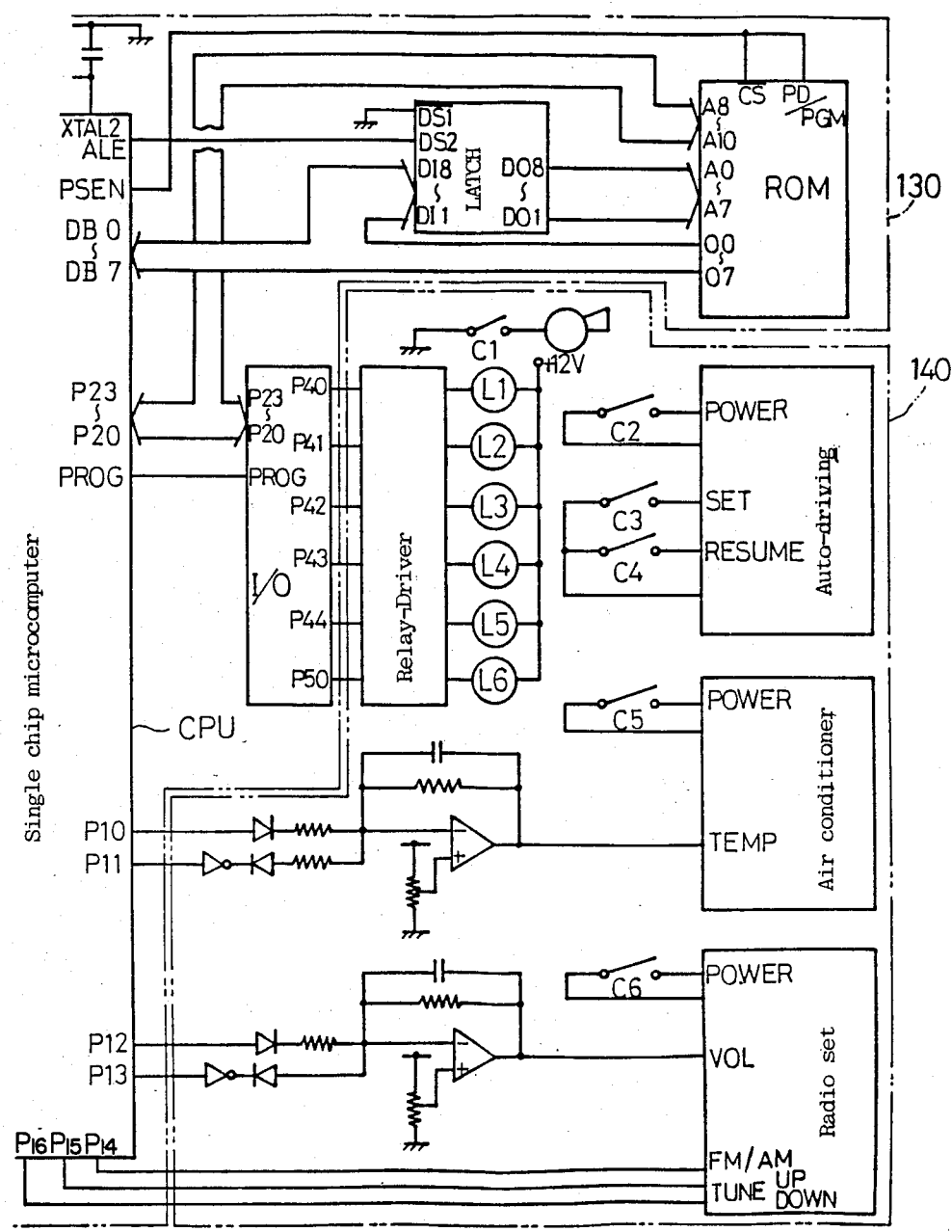

FIGS. 3c and 3d show a circuitry of the stationary control unit. Similarly to the steering control board, the stationary control unit comprises the modulation/driving circuit 150 (composed of a pulse oscillator 151, FSK modulator 152, output gate 153 and a sending driver 154), and a demodulation circuit 160 (composed of an amplification/waveform shaping cirucit 161, noise discriminating circuit 162 and a FSK demodulator 163). In this embodiment, a constant speed control unit, air conditioner and a radio set are connected to the microcomputer unit 130 through a relay driver and relays. The ROM of the microcomputer unit 130 stores therein control program data which is used to decode a receiving code and to control energization of the relays L1 through L6, in addition to FSK sending/receiving control program data.

FIG. 5 shows input and output signals for the modulation/driving circuits 100 and 150 as well as the demodulation circuits 110 and 160 shown in FIGS. 3a, 3b, 3c and 3d. Operation of the modulation/driving circuit 100 and the demodulation circuit 110 will be now explained with reference to FIG. 5. The modulation/driving circuit 150 and the demodulation circuit 160 are operated in the same way as the modulation/driving circuit 100 and the demodulation circuit 110, so the description on the former two circuits will be dispensed with.

First, when an output port P24 of the single-chip microcomputer CPU assumes a high level H, the pulse oscillator 101 is energized to generate constant frequency pulses B. In this state, if an output port P25 assumes a high level H, output C from the modulator 102 is given by pulses in synchronism with the pulses B, whereas if the output port P25 assumes a low level L, the output C is given by pulses with frequency equal to a half of that of the pulses B. Accordingly, a pulse period of the output C becomes equal to that of the pulses B while the port P25 assumes a high level H, and it becomes twice that of the pulses B while the port P25 assumes a low level L.

A pulse signal of such output C is amplified by the driver 104 and then applied to the photo diodes PD1, PD2 and PD3. Upon this, the photo diodes PD1, PD2 and PD3 emit light signals of the same toward the photo transistors PT1, PT2 and PT3 which are oppositely positioned, respectively.

For convenience of explanation, operation of the receiving side will be described with reference to the photo transistors PT4, PT5 and PT6 instead of PT1, PT2 and PT3. When a light with intensity higher than a predetermined level reaches any one of the photo transistors PT4, PT5 and PT6, an input terminal of the amplification/waveform shaping circuit 111 becomes a low level L, whereas when a light with a predetermined intensity does not reach any of PT4, PT5 and PT6, the input terminal of the amplification/waveform shaping circuit 111 becomes a high level H.

In other words, since the light signals of the same are emitted from the three photo diodes toward the three photo transistors, the three photo transistors PT4, PT5 and PT6 are turned ON and OFF simultaneously, when all of optical paths connecting the three photo diodes to the three photo transistors are not interrupted. And in case, for example, only the optical path leading to PT4 is interrupted, PT4 remains turned OFF but PT5 and PT6 are turned ON and OFF simultaneously in accordance with the light signals. As an alternative, in case the optical paths leading to PT4 and PT5 are interrupted, both PT4 and PT5 remain turned OFF but only PT6 is turned ON and OFF in accordance with the light signal.

As previously noted, there is no possibility that all of the photo transistors PT4, PT5 and PT6 are shielded from the light at the same time, so that at least one of light beams emitted from the photo diodes reaches the photo transistor. As a result, at the input terminal of the amplification/waveform shaping circuit 111 there always generates an electric signal (voltage) in accordance with the light signal from the photo diodes on the sending side.

This electric signal is amplified and shaped by the amplification/waveform shaping circuit 111 into a pulse signal which has a short rising and falling time. Thus shaped pulse signal E is passed through the noise discriminating circuit 112 to become a signal F, each pulse of which has a predetermined period of high level. The signal F is integrated by the FSK demodulator 113 and then converted into an analog signal H, which is further converted into a binary signal I to be applied to an input port TO of the microcomputer CPU.

The microcomputer CPU of the unit 80 allows the output port P25 to become H during a time period of T and to become L during a subsequent time period of T when a transmitted bit assumes a high level H, and then it allocates this one period 2T to 1 bit. When the transmitted bit assumes a low level L, the microcomputer CPU of the unit 80 allows the output port P25 to become H during a time period of ½T and to become L during a subsequent time period of ½T, and then it allocates this one period T to 1 bit. In receiving, when the input port TO assumes H during a time period of T, the microcomputer CPU reads it as that 1 bit data H has arrived, whereas when the input port TO assumes H during a time period of ½T, the microcomputer reads it as that 1 bit data L has arrived. The microcomputer CPU of the unit 130 carries out the sending/receiving processing and reading in a similar way.

In this embodiment, a frame of the transmitted signal includes a mark code comprising 10 bits of H which denotes the head of the frame, one bit of L denoting the beginning end of data, data of 16 bits, and a CRC check bit comprising 8 bits, as shown in FIG. 4a, these bits being time-serially arranged. The data bits are further divided into two A and B groups each comprising 8 bits. As shown in FIG. 4b, data (key switch state informing bits) for indicating energization of a horn and for control of a radio set are allocated to the A group, and, as shown in FIG. 4c, data (key switch state informing bits) for control of constant speed traveling and for control of an air conditioner are allocated to the B group.

Figure 6A:
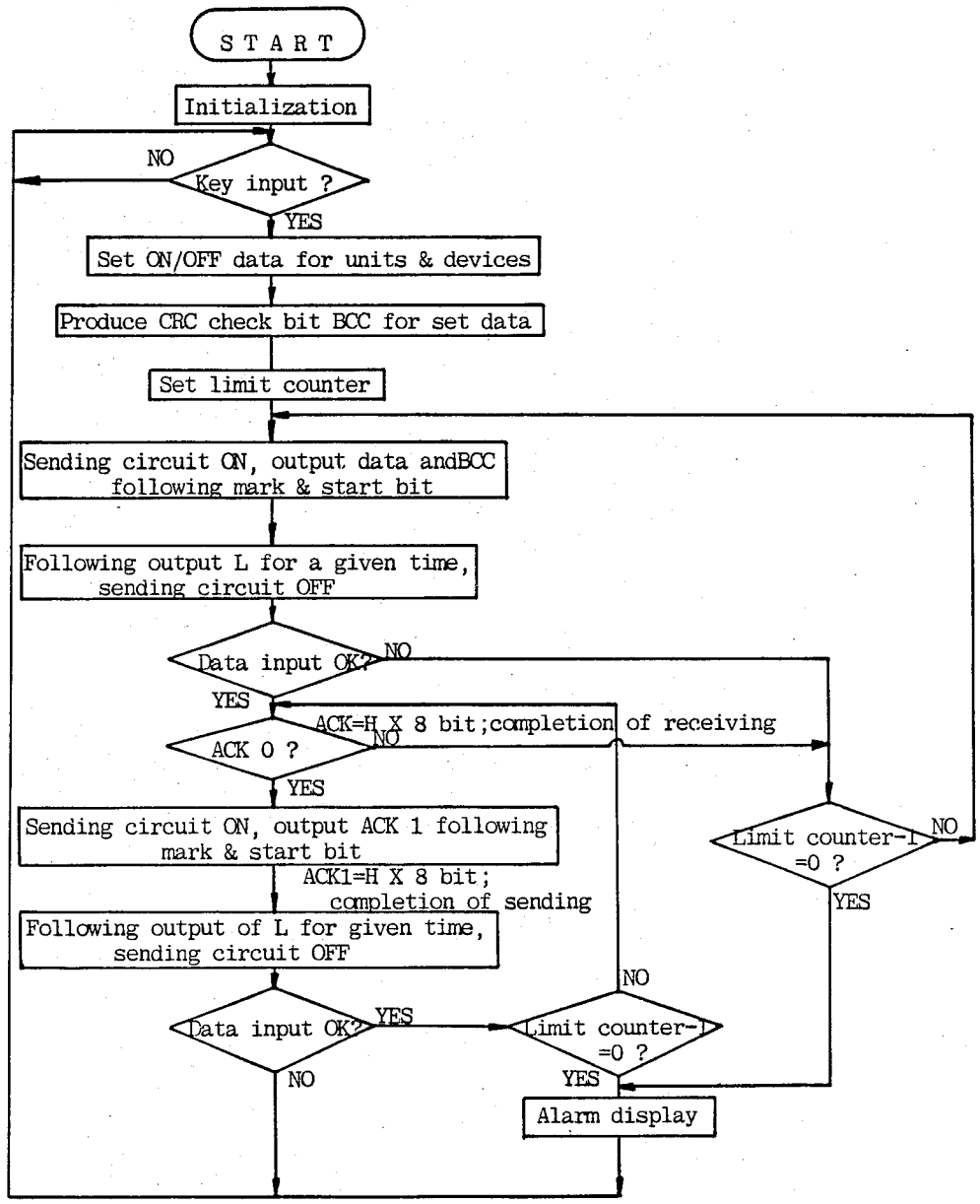
FIG. 6a is a flow chart showing the sending and receiving control operation of the microcomputer 80 shown in FIGS. 8a and 3b.

FIG. 6a is a flow chart showing operation of data transmission control performed by the microcomputer 80 (shown in FIGS. 3a and 3b) in the control board 31.

Referring now to FIG. 6a, when source power is applied, the CPU of the unit 80 initialize an input reading register as well as the input/output ports and it monitors the input ports of the input/output interface I/O as well as the input ports P13 through P10 of itself. When there occurs any change in the state showing that the keys or switches are closed, the CPU sets the bits at the respective input ports of the input/output interface I/O and the respective input ports P13 through P10 of the microcomputer CPU into the input reading register, and then it converts the content of the register into the transmitted data (data A plus data B) and also forms the CRC check bit BCC for the transmitted data.

Thereafter, a predetermined value is set in a register for checking errors in sending and receiving, a high level of H is set at the output port 24, and pulses of 2T period (in case the data bit assuming H) or T period (in case the data bit assuming L) are output at the output port P25 while allocating one period to one bit, in accordance with the respective bits of the mark code, start bit, data and the BCC.

With this, pulse voltages corresponding to the serial bit arrangement of the transmitted frame (FIG. 4a) reach the demodulation circuit 16p on the stationary control unit side through the modulation/driving circuit 100, the photo diode PD1, PD2 or PD3 and the photo transistor PT1, PT2 or PT3. As a result of demodulation of thus arrived pulse voltages, pulses similar to ones sent from the output port P25 of the CPU (shown in FIGS. 3a and 3b) in the control board are applied to the input port TO of the CPU (shown in FIGS. 3c and 3d) in the stationary control unit.

Upon completion of signal sending of 1 frame (FIG. 4a), the CPU (shown in FIGS. 3a and 3b) in the control board makes a programmable interval timer incorporated therein turn ON and outputs pulses of ½T period assuming L at the output port P25. If time is out, both output ports P24 and P25 are made to become L and the timer is turned ON, and thereafter the CPU waits for that the input terminal TO will assume H.

When there occurs a high level H at the input terminal TO before the timer will be time-out, the CPU counts a time period of T and judges whether it shows the data H or the data L. Thus judged data is memorized in a received data register and a bit number count register is incremented. Subsequently, this process will be repeated likewise each when a level at the input terminal TO is changed from L to H. When the counter register counts up to 19, the content (ACK) of the received data register from 12th bit to 19th bit is checked. If all of those bits are L (completion of receiving), the port P24 is turned to be H once again and then pulses corresponding to a frame which comprises the mark code (10 bits), the start 1 bit and ACK 8 bits of all H levels are output at the port P25. Then, after setting the port P25 at a low level L for a predetermined period of time, the P24 is turned to be L. Thereafter, the input terminal TO is monitored for a predetermined period of time. During this monotiring period, if the input terminal TO assuems H, data is written into the received data register, as previously noted, and this data is read while decrementing a limit counter. And if the data comprises ACK of 8 bits L (ACK represents a reply code including 8 bits where all bits L=0 means completion of receiving and all bits H=1 means completion of sending), it is judged that receiving has been completed. If the data denoting completion of receiving (i.e., ACK=L×8 bits) does not arrive, the data frame is transmitted once again while decrementing the limit counter.

If the content of the limit counter becomes zeros, this is regarded as anomaly so that an alarm lamp on the control board is lit up and the flow is returned back to the step of key input reading. In case the input terminal TO assumes H after once receiving the ACK (=L×8 bits) frame denoting completion of receiving, data reading is carried out while decrementing the limit counter. If the data comprises ACK=L×8 bits, ACK=H×8 bits denoting completion of sending is sent out once again, whereas if the data does not comprise ACK=L×8 bits, the limit counter is further decremented. If the limit counter becomes zero after receiving ACK "0" denoting completion of receiving, alarm display is set and the flow is returned back to the step of key input reading.

In data input reading, the state signals of the input ports are read at predetermined intervals of time and thus read signals are compared with the memory bits stored in the input register. When some input is changed and different from the corresponding memory bit in the input register, this leads to such a judgment that key or switch input has arrived. Thus, the input state signal is written into the input register and then the above-stated sending and receiving are carried out subsequently.

Figure 6B:
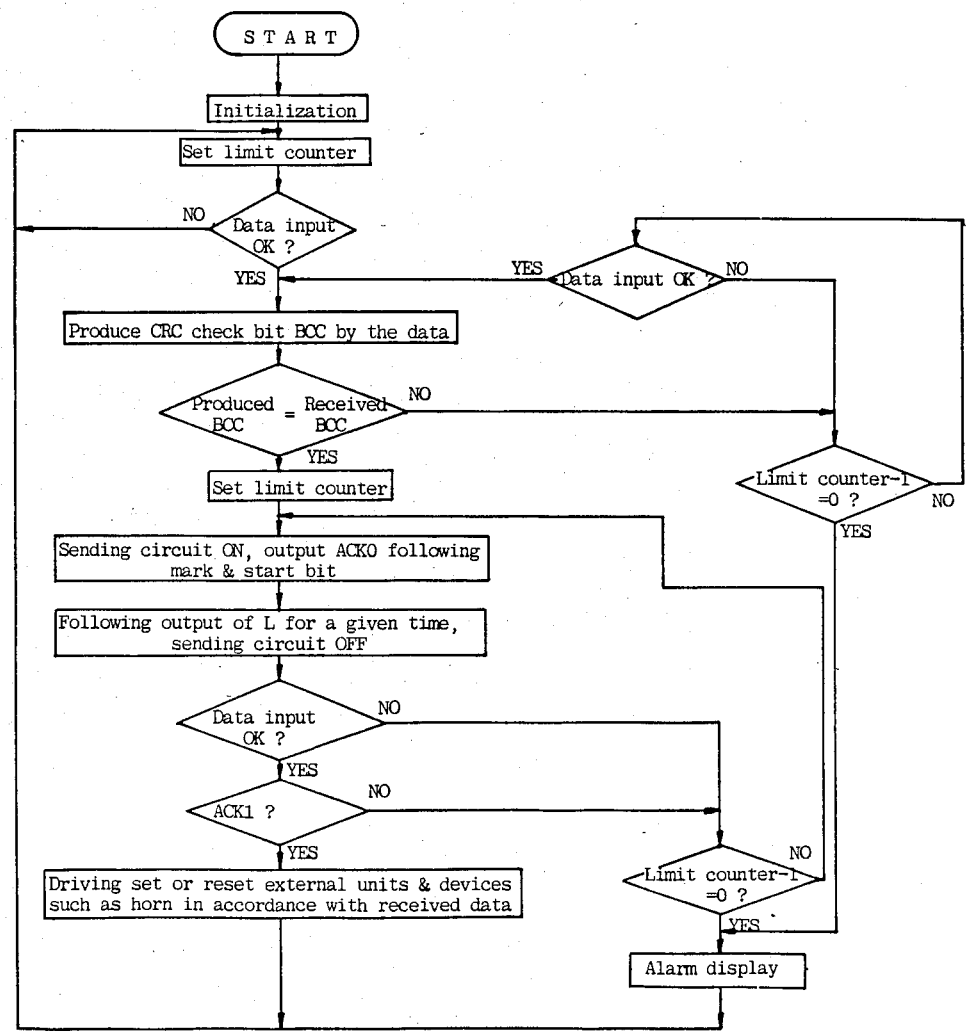
FIG. 6b is a flow chart showing the sending and receiving control operation of the microcomputer 130 shown in FIGS. 3c and 3d.

FIG. 6b is a flow chart showing operation of data transmission control performed by the microcomputer CPU (shown in FIGS. 3a and 3d) in the stationary control unit. This operation is basically similar to that of data transmission control made by the CPU (shown in FIGS. 3a and 3b) in the control board. But the former operation is different from the latter in that a CRC check bit is produced from the data bits in the received data and is compared with the received BCC to check errors in sending and receiving, that upon receiving with no error, the data section of the data frame (shown in FIG. 4a) is converted into 8 bits of all L (ACK "0") and thus obtained frame denoting completion of receiving is sent out, and that the received data is converted into a units and devices control code which is set at an output port leading to the units and devices 140.

In this connection, it becomes possible to effect bidirectional remote indication and control by connecting other display means, informing means, small-sized units and devices, etc. to the microcomputer unit 80 in the control board in addition to the above, by connecting key switches to the unit 130 as required, and by storing the program data capable of executing the control operation as shown in FIG. 6b into the CPU's of both units 80 and 130. Although in the above embodiment data transmission was carried out through FSK modulation and demodulation, other modulation/demodulation systems may be employed which are used in general data transmission.

Further, although in the above embodiment the battery was employed as a power source for the steering control board, it is also possible that, as disclosed in U.S. patent application Ser. No. 399,582, power lines for the steering control board are connected to a load-vehicle battery through a slip ring and a brush, or that AC power is fed to the steering control board through an electromagnetic coupling using an electric coil and thus fed AC power is rectified to obtain predetermined DC voltage necessary for the steering control board.

According to this invention, as fully described in the above, data transmission can be effected positively between the steering control board and the stationary control unit at all times regardless of operation of the steering wheel.

Having now fully set forth both structure and operation of preferred embodiment of the concept underlying the present invention, various other embodiments as well as certain variations and modifications of the embodiment herein shown and described will obviously occur to those skilled in the art upon becoming familiar with the underlying concept. It is to be understood, therefore, that with the scope of the appended claims, the invention may be practiced otherwise than as specifically set forth herein.

What I claim is:

1. A signal transmission apparatus for a steering control board comprising:
   a steering control board disposed near a steering wheel in a floating relation with respect to said steering wheel and equipped with switches;
   stationary member for supporting said steering wheel;
   at least two light emitting means disposed on at least either one of said steering control board and said stationary member at different positions located outside of the position where at least one spoke for supporting said steering wheel is supported, so that all of said light emitting means are not entered in the projected area of said spoke at the same time;
   at least two light receiving means disposed on at least the other one of said steering control board and said stationary member at positions opposite to said light emitting means, respectively, whereby at least one light path between one of the light emitting means and the opposed light receiving means is maintained at all times during rotation of the steering wheel;
   a light emission energizing means adapted to energize said light emitting means;
   a modulating means connected to said light emission energizing means;
   a first control means adapted to control said modulating means;
   a signal detecting means connected to said light receiving means;
   a demodulating means connected to said signal detecting means; and
   a second control means adapted to control said demodulating means.

2. A signal transmission apparatus for a steering control board according to claim 1, wherein said stationary member is provided with a first gear for rotatably supporting a steering shaft, said steering control board is provided with a second gear rotatably supported by said steering shaft or said steering wheel, and a member connecting said steering shaft and said steering wheel is provided with a third gear in mesh with said first gear and a fourth gear in mesh with said second gear, said third and fourth gears being connected to each other.

3. A signal transmission apparatus for a steering control board according to claim 2, wherein said first and second gears have the same number of teeth, and said third and fourth gears have the same number of teeth.

4. A signal transmission apparatus for a steering control board according to claim 2, wherein said third and fourth gears are secured at both ends of a shaft rotatably penetrating said spoke for supporting said steering wheel.

5. A signal transmission apparatus for a steering control board according to claim 1, wherein said light emitting and receiving means are provided on each of said control board and said stationary member in number at least two.

6. A signal transmission apparatus for a steering control board comprising:
   a stationary member mounted on a vehicle body;
   a first gear secured to said stationary member;
   a steering shaft penetrating the central portion of said first gear;
   a steering wheel secured to said steering shaft and having at least one spoke;
   a second gear supported by said steering shaft or said steering wheel to be rotatable with respect to said steering wheel and having the same number of teeth as said first gear;
   a steering wheel control board supported by said second gear and equipped with switches;
   a gear shaft rotatably penetrating said spoke of said steering wheel;
   a third gear secured at one end of said gear shaft and in mesh with said first gear;
   a fourth gear secured at the other end of said gear shaft and in mesh with said second gear;
   at least two light emitting means disposed on at least either one of said steering control board and said stationary member at different positions located outside of the position where said spoke for supporting said steering wheel is supported, so that all of said light emitting means are not entered in the projected area of said spoke at the same time;
   at least two light receiving means disposed on at least the other one of said steering control board and said stationary member at positions opposite to said light emitting means, respectively, whereby at least one light path between one of the light emitting means and the opposed light receiving means is maintained at all times during rotation of the steering wheel;
   a light emission energizing means adapted to energize said light emitting means;
   a modulating means connected to said light emission energizing means;
   a first control means adapted to control said modulating means;
   a signal detecting means connected to said light receiving means;
   a demodulating means connected to said signal detecting means; and
   a second control means adapted to control said demodulating means.

7. A signal transmission apparatus for a steering control board according to claim 7, wherein said light emitting and receiving means are provided on each of said control board and said stationary member in number at least two.

* * * * *